No. 698,682. Patented Apr. 29, 1902.
T. DUNCAN.
ELECTRICAL MEASURING INSTRUMENT.
(Application filed Jan. 2, 1900. Renewed Dec. 16, 1901.)
(No Model.)
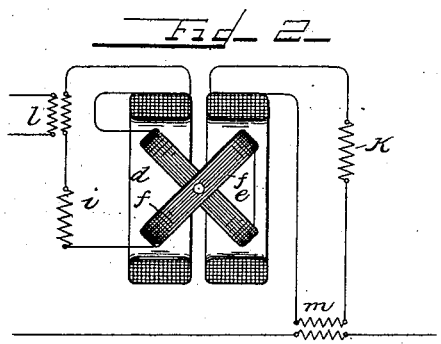
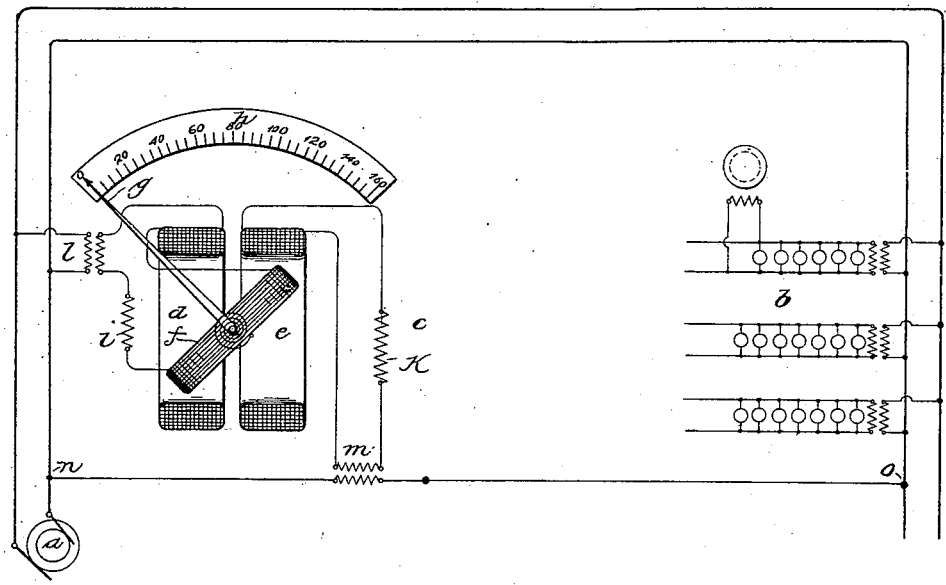

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ELECTRICAL MEASURING INSTRUMENT.

SPECIFICATION forming part of Letters Patent No. 698,682, dated April 29, 1902.

Application filed January 2, 1900. Renewed December 16, 1901. Serial No. 86,062. (No model.)

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, (Case No. 344,) of which the following is a full, clear, concise, and exact description, reference being had to the accompanying drawings, forming a part of this specification.

My invention relates primarily to alternating-current systems of distribution, although certain features of the invention may be employed in connection with other systems of distribution; and the invention has for its object the provision of an improved compensating voltmeter which is adapted to accurately determine the pressure at a distant point in a system of transmission.

When the pressure at any point distant from the generating-station is accurately determined, this pressure may be maintained constant by regulation of the impressed pressure to compensate for load changes and the C R drop over the distributing-lines due thereto, which varies directly as the load.

Two ways have hitherto been frequently practiced for measuring the pressure at a predetermined point in the line distant from the generating-station. A common way is to employ an ordinary voltmeter upon the station-switchboard which is connected at the distant point—for example, the center of distribution—by means of two pressure-wires, the instrument then indicating the pressure at the distant point. When the distance between the distant predetermined point of the line and the generating-station is great, the expense of these pressure-wires is significant when a great number of machines are used. It has also been the practice to employ a voltmeter included in a circuit with two secondary coils whose primaries are respectively in series with a main transmission-line and bridged between the transmission-lines. This method, however, is objectionable, since the meters do not under all circumstances exactly measure the pressure at distant points, as the effect of the series transformer-coil is the same irrespective of the distribution of the load.

By means of my present invention I am enabled to dispense with a pressure-wire employed in one of the aforesaid prior methods to reduce the cost of line construction and at the same time maintain accuracy in the determination of the pressure at the distant point of distribution where the pressure is to be measured. I am also enabled to overcome the disadvantages of the second aforesaid prior method of determining the pressure at points distant from the generator-station in that I am enabled to accurately determine this pressure irrespective of the distribution of the load.

In practicing my invention I preferably employ a meter having two windings, one for interposition between a point of the transmission system at the generator and a second point distant from the generator. A torque is created by this winding which is proportional to the C R drop between the connected points. I preferably connect the second winding between the mains of the transmission system. A portion of the second winding in the preferred embodiment of the invention is in the form of a coil which is rotatably mounted, preferably upon a shaft to which a pointer is attached, the subdivided portions of this second winding being preferably included in series. A scale is provided upon which the pointer may indicate measurements. Where the system of transmission is being supplied with current of high pressure, I preferably interpose transformers between each winding of the meter and the source of current therefor to reduce the pressure impressed upon these windings.

I will explain my invention more particularly by reference to the accompanying drawings, in which—

Figure 1 diagrammatically indicates apparatus constructed in accordance with the preferred embodiment of my invention and a system of distribution with which the said apparatus is associated. Fig. 2 is a diagrammatic view showing a modification of an instrument constructed in accordance with my invention.

Like parts are indicated by similar letters of reference in both views.

In Fig. 1 I have illustrated an alternating-current system of distribution, a source of alternating current *a* being shown as supplying current to translating devices *b*.

The instrument *c* may be constructed as shown in Fig. 1. I have provided two stationary field-coils *d e*, between which a shaft is placed, a third coil *f* being mounted to rotate with the shaft. In order to adapt the instrument to the measurement of voltages in alternating-current systems of electrical distribution, the coils thereof are unprovided with iron cores. A pointer *g* moves with the revoluble coil, a scale *h* being provided upon which the pointer may indicate measurements. The coils *d* and *f* form parts of the same winding, these coils being shown in series, although I do not wish to be limited to this series arrangement of the coils.

The instrument illustrated in Fig. 2 is similar to that shown in Fig. 1, the portion *f* being subdivided into two coils. A resistance *i*, extraneous to the winding composed of the parts *d* and *f*, is provided to prevent waste of current, a resistance *k* for like purpose being also included in series with the winding *e*. Torsional springs may be provided in the well-known way to act against the torques of the instrument.

In the present instance I have illustrated a system of alternating-current distribution of high electromotive force, and instead of connecting the windings of the meter directly between the mains of the system and the conductor interposed between a point of the transmission-circuit *n* near the generator and a distant point *o* I employ transformers *l* and *m*, whose primaries are connected, respectively, between the mains of the system and with the said conductor. This conductor, it will be observed, is in the present instance in shunt of one of the mains. The instrument as thus arranged is adapted to effect a movement of the pointer proportional to the algebraic sum of the impressed pressure and the *c r* drop. Assuming that there is no load upon the system the instrument will indicate only the impressed pressure when a load is put upon the system, and as it increases the current in the winding *e* will increase proportionally to the drop over the lines. As has been said, in effect, the winding *e* opposes the magnetizing effect of the winding *d*, resulting in the indication upon the scale being the difference between the pressure at the station and the drop over the lines or the actual voltage at the point of service *o*—*i. e.*, the instrument reads the electromotive force at any predetermined point. If, for example, the dynamo-pressure is one hundred and four volts and the drop over the lines is four volts, then the resultant volts indicated on the instrument will be one hundred and four volts, minus four volts, equaling one hundred volts. I preferably so adjust the windings of the instrument that the winding receiving current from the conductor joining the points of the transmission-circuit *n* and *o* will produce proportionally twice the torque for a given pressure impressed at its terminals than that caused by the winding subjected to the generator-pressure.

In applications Serial Nos. 87, 88, and 89, filed of even date herewith I have shown systems of direct-current distribution and improved means for measuring the voltage at points in the transmission systems distant from the generator. While I have shown transformers for supplying current to the windings of the instrument, I do not wish to be limited to this particular means.

While I have herein shown and particularly described one embodiment of my invention, it is obvious that changes may readily be effected without departing from the spirit thereof, and I do not, therefore, wish to be limited to the precise construction shown; but,

Having thus described my invention, I claim as new and desire to secure by Letters Patent—

1. In a system of electrical distribution, the combination with an alternating-current generator supplying current to a transmission-circuit, of a measuring apparatus having a voltmeter-winding subjected to pressure between the generator-terminals, and a second pressure-winding subjected to pressure between a point of the transmission-circuit and a second and distant point of the transmission-circuit where the pressure is to be determined, to determine the *c r* drop, whereby the pressure at distant points of the transmission-circuit may be readily determined, substantially as described.

2. In a system of electrical distribution, the combination with an alternating-current generator supplying current to a transmission-circuit, of a measuring apparatus having a voltmeter-winding subjected to pressure between the generator-terminals, and a second pressure-winding subjected to pressure between a point of the transmission-circuit near the generator and a second and distant point of the transmission-circuit where the pressure is to be determined, whereby the pressure at a distant point of the transmission-circuit may be determined, substantially as described.

3. In a system of electrical distribution, the combination with an alternating-current generator supplying current to a transmission-circuit, of a measuring apparatus having a voltmeter-winding subjected to pressure between the generator-terminals and a second pressure-winding subjected to pressure between a point of the transmission-circuit and a second and distant point of the transmission-circuit where the pressure is to be determined, to determine the $cr$ drop, whereby the pressure at distant points of the transmission-circuit may be readily determined, said second winding receiving current from a conductor in shunt of one side, or a portion of one side of the transmission-circuit, substantially as described.

4. In a system of electrical distribution, the combination with an alternating-current generator supplying current to a transmission-circuit, of a measuring apparatus having a voltmeter-winding subjected to pressure between the generator-terminals, and a second pressure-winding subjected to pressure between a point of the transmission-circuit near the generator and a second and distant point of the transmission-circuit where the pressure is to be determined, whereby the pressure at a distant point of the transmission-circuit may be determined, said second winding receiving current from a conductor in shunt of one side, or a portion of one side of the transmission-circuit, substantially as described.

5. In a system of electrical distribution, the combination with an alternating-current generator supplying current to a transmission-circuit, of a measuring instrument having a voltmeter-winding subjected to pressure between the generator-terminals, and a second pressure-winding subjected to pressure between a point of the transmission-circuit and a distant point of the transmission-circuit where the pressure is to be determined, and means whereby said windings may coöperate to produce a single actuation of the movable element of the meter to measure the pressure at said distant point, substantially as described.

6. In a system of electrical distribution, the combination with an alternating-current generator supplying current to a transmission-circuit, of a measuring instrument having a voltmeter-winding subjected to pressure between the generator-terminals, and a second pressure-winding subjected to pressure between a point of the transmission-circuit and a second, distant point where the pressure is to be determined, said windings coöperating to actuate the movable element of the meter to determine the pressure at said distant point, substantially as described.

7. In a system of electrical distribution, the combination with an alternating-current generator, supplying current to a transmission-circuit, of a measuring instrument having a voltmeter-winding subjected to pressure between the generator-terminals, and a second pressure-winding subjected to pressure between a point of the transmission-circuit and a second, distant point where the pressure is to be determined, said windings coöperating to actuate the movable element of the meter, said windings being adapted each to create a torque opposing a torque due to the other whereby a resultant torque is produced to actuate said element to measure the pressure at said distant point, substantially as described.

8. In a system of electrical distribution, the combination with an alternating-current generator supplying current to a transmission-circuit, of a measuring instrument having a voltmeter-winding subjected to pressure between the generator-terminals, and a second pressure-winding subjected to pressure between a point of the transmission-circuit and a distant point of the transmission-circuit where the pressure is to be determined, and means whereby said windings may coöperate to produce a single actuation of the movable element of the meter, said windings being adapted each to create a torque opposing the torque due to the other, whereby a resultant torque is produced to actuate said element to measure the pressure at said distant point, substantially as described.

9. In a system of electrical distribution, the combination with an alternating-current generator supplying current to a transmission-circuit, of a transformer whose primary is connected between the generator-terminals, a second transformer whose primary is connected between a point of the transmission-circuit and a second and distant point of the transmission-circuit where the pressure is to be determined, and a measuring apparatus having two voltmeter-windings connected respectively with the secondaries of the said transformers, substantially as described.

10. In a system of electrical distribution, the combination with an alternating-current generator supplying current to a transmission-circuit, of a transformer whose primary is connected between the generator-terminals, a second transformer whose primary is connected between a point of the transmission-circuit and a second and distant point of the transmission-circuit where the pressure is to be determined, and a measuring apparatus having two voltmeter-windings connected respectively with the secondaries of the said transformers, the conductor including the primary of the second transformer being connected in shunt of a transmission-conductor, or a portion thereof, substantially as described.

11. In a system of electrical distribution, the combination with an alternating-current generator supplying current to a transmission-circuit, of a transformer whose primary is connected between the generator-terminals, a second transformer whose primary is connected between a point of the transmission-circuit and a second distant point where the pressure is to be determined, and a measuring instrument having two windings connected respectively with the secondaries of the said transformers, the said windings coöperating to actuate the movable element of the meter to determine the pressure of the meter at said distant point, substantially as described.

12. In a system of electrical distribution, the combination with a generator, of two stationary coils, one subjected to pressure between the generator-terminals, and the other subjected to pressure between a point near the generator and a distant point of the transmission-circuit, and a single movable element subjected to the action of said coils, substantially as described.

13. In a system of electrical distribution, the combination with a generator, of a measuring instrument having two windings, one subjected to pressure between the generator-terminals and the other subjected to pressure between a point of the transmission-circuit near the generator and a second and distant point of the transmission-circuit where the pressure is to be determined, the winding that is subjected to pressure between the generator-terminals being divided into two coils, one of which is stationary and the other rotatably mounted, the revoluble coil being subjected to the action of the remaining coil and winding, substantially as described.

14. In a system of electrical distribution, the combination with a generator, of a measuring instrument having two windings, one subjected to pressure between the generator-terminals, and the other subjected to pressure between a point of the transmission-circuit near the generator and a second distant point of the transmission-circuit where the pressure is to be determined, the winding that is subjected to pressure between the generator-terminals being divided into two coils which are included in series with each other, one of which is stationary and the other rotatably mounted, the latter being subjected to the action of the remaining coil and winding, substantially as described.

15. In a system of electrical distribution, the combination with a generator, of a measuring instrument having two windings, one subjected to pressure between the generator-terminals and the other subjected to pressure between a point of the transmission-circuit near the generator and a second distant point of the transmission-circuit where the pressure is to be determined, the winding that is subjected to pressure between the generator-terminals being divided into two coils, one of which is stationary and the other rotatably mounted, the revoluble coil being subjected to the action of the remaining coil and winding, a pointer carried by the revoluble coil, and a scale upon which the pointer may indicate measurements, substantially as described.

16. In a system of electrical distribution, the combination with a generator, of a measuring instrument having two windings, one subjected to pressure between the generator-terminals, and the other subjected to pressure between a point of the transmission-circuit near the generator and a second distant point of the transmission-circuit where the pressure is to be determined, the winding that is subjected to pressure between the generator-terminals being divided into two coils which are included in series with each other, one of which is stationary and the other rotatably mounted, the latter being subjected to the action of the remaining coil and winding, a pointer carried by the revoluble coil, and a scale upon which the pointer may indicate measurements, substantially as described.

17. In a system of electrical distribution, the combination with a generator, of a measuring instrument having two windings, one subjected to pressure between the generator-terminals and the other subjected to pressure between a point of the transmission-circuit near the generator and a second distant point of the transmission-circuit where the pressure is to be determined, the winding that is subjected to pressure between the generator-terminals being divided into two coils, one of which is stationary and the other rotatably mounted, substantially as described.

18. In a system of electrical distribution, the combination with a generator, of a measuring instrument having two windings, one subjected to pressure between the generator-terminals, and the other subjected to pressure between a point of the transmission-circuit near the generator and a second, distant point of the transmission-circuit where the pressure is to be determined, the winding that is subjected to pressure between the generator-terminals being divided into two coils which are included in series with each other, one of which is stationary and the other rotatably mounted, substantially as described.

In witness whereof I hereunto subscribe my name this 20th day of December, A. D. 1899.

THOMAS DUNCAN.

Witnesses:
 WILLIAM F. MEYER,
 JAMES W. DALTON.